३,४२८,४१७
PURIFICATION OF CALCIUM CHLORIDE LIQUORS
William F. Pesold, Riverview, Mich., assignor to Wyandotte Chemicals Corporation, Wyandotte, Mich., a corporation of Michigan
No Drawing. Filed Nov. 23, 1966, Ser. No. 596,408
U.S. Cl. 23—90
Int. Cl. C01f *11/24;* C01b *33/22*
4 Claims

ABSTRACT OF THE DISCLOSURE

This invention relates to a novel method of removing impurities which are present in commercial calcium chloride by treatment with precipitated magnesium silicate.

---

Calcium chloride normally is prepared by the ammonia-soda or Solvay process in which ammonia, carbon dioxide, and salt (sodium chloride) are reacted in aqueous solution to produce sodium bicarbonate and ammonium chloride. After removal of the sodium bicarbonate, the ammonium chloride is reacted with lime in order to release the ammonia and generate calcium chloride. This calcium chloride is then concentrated, usually to concentrations of over 50% and precipitated salts, such as sodium chloride and the like, are then removed from the aqueous solution. Thereafter, the aqueous solution is either used as such or is diluted.

Products produced by the above method normally contain iron in varying proportions usually ranging from about 5 to 150 parts per million which discolors the product. All figures on "parts per million" appearing herein are based on the amount of calcium chloride present. The iron appears to be in several states of combination, including types which can be filtered and other varieties of iron which appear to be in a colloidal state, i.e., cannot be removed by filtering or practical contrifuging.

Accordingly, it is a purpose of this invention to provide a process whereby iron impurities, including the difficultly removable colloidal iron which is normally present, may be removed from inexpensive commercial grades of calcium chloride by a process which is simple and effective.

In accordance with the present invention, iron is removed from commercial calcium chloride liquor by treatment with precipitated magnesium silicate.

In treatment of the calcium chloride liquor in accordance with the present invention, it is possible to vary the proportion of precipitated magnesium silicate added over a wide range. It has been found that as little as 0.1% magnesium silicate by weight of the calcium chloride being treated may be employed. Almost any amount greater than this is permissible, however, the use of large amounts is wasteful and uneconomical since large amounts are not required. Ordinarily, an amount of the magnesium silicate ranging from about 0.1% to 5% by weight of the calcium chloride is practical.

The treatment may be performed by merely mixing or adding magnesium silicate to the calcium chloride liquor.

The reaction or contact time necessary to effect the precipitation of the iron may be easily determined by those skilled in the art through simple trial and error. While longer contact times may be employed, the contact time may be as little as about 1 hour or less. Mild or occasional agitation is desirable in that less contact time is required than where no agitation is employed. At the end of the contact or waiting period the calcium chloride liquor is filtered in a conventional filtration apparatus to remove the magnesium silicate and the occluded iron.

It has been found that there is no apparent increase in magnesium content as a result of this magnesium silicate treatment and that this treatment not only removes iron but also removes phosphorus, both of which may then be removed by filtration. Both batch and continuous filtration processes may be employed. In a continuous filtration process, generally the treated liquor would be in two or more feed containers whereby when one container is empty the next container is connected to the filter by a suitable conventional valve arrangement to continue the filtration.

The practice of this invention is further illustrated by the following examples.

EXAMPLE I

Two different calcium chloride solutions were treated, both of which were prepared in the conventional way by practice of the ammonia-soda process described above. One solution was a concentrated calcium chloride liquor which was diluted to 28% by weight calcium chloride and the other was a concentrated calcium chloride liquor which was diluted with water to 33% by weight calcium chloride.

250 grams of each solution were placed in a 16-ounce jar and hydrated precipitated magnesium silicate having the empirical formula $MgO \cdot 2.5SiO_2$ added to each solution in the amount of 3% by weight of the calcium chloride content. Each mixture was allowed to set for 2 days with periodic agitation. The solution prepared from the 33% liquor was filtered through a fine fritted glass funnel while the solution from the 28% liquor was divided into two equal parts, half of which was filtered through a fine glass frit funnel and the other half through No. 41 filter paper on a Buchner funnel. Both solutions were analyzed before and after treatment. The 28% liquor was found to contain 7 parts per million of iron and 4 parts per million of phosphorus before treatment. The portion that was filtered in the fine frit funnel contained no detectible amounts of iron of phosphorus. The portion that was filtered through the No. 41 filter paper contained less than 1 part per million of iron and no detectible amounts of phosphorus. The material from the 33% calcium chloride liquor contained 6 parts per million of iron and 3 parts per million of phosphorus before treatment and less than 1 part per million of iron and no detectible amount of phosphorus after treatment.

EXAMPLE II 90 pounds of hydrated precipitated magnesium silicate having the empirical formula $MgO \cdot 2.5SiO_2$ were added to 27,000 pounds of 33% calcium chloride liquor in a 10,000-gallon tank. The calcium chloride liquor was concentrated calcium chloride liquor prepared in the conventional way by practice of the ammonia-soda process and then diluted with water to a content of 33% by weight calcium chloride. The solution was agitated by compressed air injected into the solution through nozzles for an initial period of ½ hour followed by air agitation for periods of 5 minutes every hour. The solution was analyzed before the addition of the magnesium silicate at time intervals indicated in Table I below. This treated material was sampled after elapsed periods of time indicated in Table I below. The samples were filtered through fine filter paper and then analyzed for iron. The amounts of iron obtained by this analysis are shown in Table I below. After 58 hours, 27,000 pounds of solution were filtered by circulation through a plate and frame filter press. The filtered solution was analyzed and found to contain 0.2 part per million of iron.

Table I

Sample identification: Fe, p.p.m.
    CaCl$_2$ before purification, time—0 hours _____ 13.0
    CaCl$_2$ after purification, time—2½ hours ____ 0.2
    Time—56 hours _____ 0.2

EXAMPLE III

Two 4,000-gallon batches of 33% calcium chloride liquor were prepared from ammonia-soda process liquor by diluting concentrated calcium chloride liquor with water to 33% by weight calcium chloride and treated in 10,000-gallon tanks with hydrated precipitated magnesium silicate having the empirical formula MgO·2·5SiO$_2$ in the amounts shown in Table II below. The amounts of magnesium silicate are in percent by weight of the total amount of calcium chloride. The solutions were analyzed for iron content before treatment and after standing subsequent to treatment for the time periods indicated in Table II below, the amounts of iron being shown in Table II below.

Table II

| Batch | Precipitated Magnesium Silicate Addition, Percent | Iron (Fe) Before Purification, p.p.m. | Iron (Fe) After Purification, p.p.m. | |
|---|---|---|---|---|
| | | | 3.5 hrs. | 6 hrs. |
| A | 0.5 | 11.7 | 6.4 | 1 |
| A | 2.0 | 11.7 | 4.2 | 0.8 |
| B | 0.5 | 11.0 | 10.8 | 1.3 |
| B | 2.0 | 11.0 | 3.2 | 0.7 |

It is to be understood that various changes and modifications may be made in the foregoing process without departing from the spirit of the invention and scope of the appended claims.

What is claimed is:

1. The method of precipitating iron impurity from calcium chloride solutions prepared by the ammonia-soda process which comprises treating the solution with a small but effective amount of precipitated magnesium silicate.

2. The process of claim 1 wherein said amount of magnesium silicate is at least about 0.1%.

3. The process of claim 2 wherein the treated solution is allowed to set for a minimum of 1 hour subsequent to treatment with the magnesium silicate.

4. The process of claim 3 wherein said calcium chloride solution is filtered subsequent to said setting period.

References Cited

UNITED STATES PATENTS 2,032,702   3/1936   Keene et al. _____ 23—90
3,329,479   7/1967   Hustinx _____ 23—90

FOREIGN PATENTS 208,846   6/1957   Australia.
783,019   9/1957   Great Britain.

EDWARD STERN, *Primary Examiner.*

U.S. Cl. X.R.

23—110